United States Patent Office 3,442,694
Patented May 6, 1969

3,442,694
PROCESS FOR SOFTENING FABRIC AND
PRODUCT THEREOF
Arnold Maurice Sookne, Silver Spring, Md., and Julian Berch, Washington, D.C., assignors, by mesne assignments, to Allied Chemical Corporation, New York, N.Y., a corporation of New York
No Drawing. Filed Apr. 28, 1965, Ser. No. 451,623
Int. Cl. C03c 25/00
U.S. Cl. 117—126    3 Claims

ABSTRACT OF THE DISCLOSURE

A process for softening nylon or fiber glass which comprises applying to said material a coating of 0.05 to 5% by weight of the material of an emulsion of oxidized homopolymers and copolymers of ethylene, having a density in the range of 0.935 to 1.05 g./cc. and a carboxyl content of 0.2 to 2.0 milliequivalents/g.

---

This invention relates to an improved process for treating nylon and fiber glass in fiber, yarn, or fabric form to improve the softness thereof. More particularly this invention relates to a process for improving the softness of fiber glass and nylon fibers, yarns, and fabrics by treating them with high density polyethylene. This invention also relates to the composition of nylon or fiber glass in fiber, yarn, or fabric form in combination with high density polyethylene.

Polymeric coatings usually stiffen the treated fabric. If the fabric is softened, it frequently loses the improvement when laundered or dry cleaned. In the case of coating with low density polyethylene, most fabrics including nylon and fiber glass, are stiffened. (See American Dyestuff Reporter, vol. 51, No. 12, pages 48–55, June 11, 1962.)

One object of the instant invention is to produce a process which will result in softening fiber glass or nylon fibers, yarns, or fabrics. Another object of the instant invention is to produce a process which will soften fiber glass or nylon fibers, yarn, or fabric and maintain softness after repeated laundering or dry cleaning. Another object of the instant invention is to produce a fiber glass or nylon fiber, yarn, or fabric impregnated with polyethylene which will remain soft after repeated laundering or dry cleaning.

In summary these and other objects are produced in the present invention by impregnating a fiber glass or nylon fiber, yarn, or fabric with an emulsion of high density polyethylene, and thereafter drying the thus-treated material. The preferred amount of polyethylene add-on is in the range 0.05 to 5%, preferably 0.1 to 2.0% based on the weight of the treated fiber, yarn, or fabric.

The application of high density polyethylene to fiber glass and nylon fibers, yarns, or fabrics results in materials which are softened, and the softening effect persists after the treated materials are subjected to numerous launderings or dry cleanings.

As used herein the term "high density polyethylene and copolymers of ethylene means ethylene homopolymer and copolymers of ethylene and other α-olefins wherein said homopolymer and said ethylene-containing copolymers have a density in the range 0.935 to 0.970 g./cc. and a crystalline melting point in the range 115 to 137° C. prior to oxidation. Thus copolymers of ethylene and other α-olefins such as propylene, butene-1, hexene-1, pentene-1, heptene-1, 4-methyl-pentene-1, 3-methyl-butene-1 and the like, which copolymers have densities in the range 0.935 to 0.970 g./cc. and crystalline melting points in the range 115 to 137° C. are operable as starting materials in this invention. For purposes of description, the invention will be explained for the most part using high density linear polyethylene per se as the material unless otherwise stated.

The term "emulsifiable polyethylene and copolymers of ethylene" herein means "high density polyethylene and copolymers of ethylene" as defined above which has been subjected to oxidation until they have a carboxyl content of 0.2 to 2.0 preferably 0.3 to 1.1 milliequivalents/g.

As used herein, unless otherwise specified, the term "emulsion" means an emulsifiable high density polyethylene dispersion in which water forms the continuous phase.

The term nylon is used in this invention to signify a polycarbonamide having recurring amide units as an integral part of the main polymer chain. Such materials are chemically known as polyamides, the most common of which are 6—6 nylon and 6 nylon. Nylon polymers suitable in the instant invention may be prepared according to processes described in United States Patent Nos. 2,071,250; 2,071,253 and 2,130,948. Other processes are well known to those skilled in the art. Nylon materials formed by the reaction of diamines and dicarboxylic acid as well as those formed by polymerization of amino acids are suitable herein. A valuable class of reactants for the use are diamines of formula $NH_2RNH_2$ and dicarboxylic acid of formula $HOOCR'COOH$ in which R and R' are divalent hydrocarbon radicals free from aliphatic unsaturation and in which each R and R' has a chain length of at least two carbon atoms. Especially useful reactants within this group are those in which R is $(CH_2)_x$ and R' is $(CH_2)_y$ in which $x$ is at least 4 and $y$ is at least 3. Instead of using a single diamine and a single dicarboxylic acid, mixtures of diamines and/or dicarboxylic acid can be employed. In order to obtain a fiber-forming nylon, the diamines and dicarboxylic acid should be used in substantially equimolecular proportions, that is not more than about 5% excess of either reactant should be employed. A small excess of either reactant may be desirable in order to obtain a nylon of stable viscosity.

As used herein, the term "fiber glass" means a manufactured fiber in which the fiber-forming substance is glass in accord with the definition used by the Textile Fiber Products Identification Act, Public Law 85-897.

The high density polyethylene operable in this invention can be produced by many methods well known in the art. For example polyethylene having a density of 0.935–0.970 can be obtained using the Phillips catalyst system, i.e. chromium oxide on a $SiO_2$—$Al_2O_3$ support wherein at least part of the chromium is in the hexavalent state. The polymerization is performed at temperatures of 60–260° C. as described in U.S. 2,825,721. Another catalyst system capable of forming the high density polyethylene used herein is disclosed in U.S. 2,816,883. Yet another catalyst system consisting essentially of vanadium oxytrichloride and ethyl aluminum dichloride will yield high density polyethylene having a melt index less than 0.01. Still another catalyst system yielding very high molecular weight polyethylene having a melt index less than 0.01 and a density of about 0.96 comprises $TiCl_3$ and diethyl aluminum chloride. Still another method of producing high density polyethylene is the Ziegler process wherein the catalyst consists essentially of compounds of metals of Group IV-B, V-B, and VI-B of the Periodic Table and an aluminum trialkyl compound as set out in Belgian Patent 533,362 issued to K. Ziegler. Yet another method of forming high density polyethylene operable herein is disclosed in U.S. 2,949,447. Other methods of producing polyethylene with a density in the range 0.935–0.970 are well known to those skilled in the art. The copolymers operable in the instant invention can be formed by the methods taught in U.S. 2,825,721 and in Belgian Patents 543,259 and 538,782.

The high density polyethylenes operable in the instant invention have a density in the range 0.935–0.970 g./cc. and a melting point in the range 115–137° C. prior to the oxidation step. However, the density of the polymer increases as the extent of oxidation increases. This is the result of the substitution of heavier oxygen atoms (atomic weight 16.0) in the polymer in place of hydrogen (atomic weight 1.008). Consequently the densities of the oxidized products of this invention range between 0.937 and 1.050 g./cc., the exact value in any instance depending on the initial density of the starting polymer, and the extent of oxidation.

The high density polyethylene of the instant invention has a weight-average molecular weight in the range 20,000 to 2,000,000 or more, calculated from fractionation data in accord with the procedure in "Techniques of Polymer Characterization," P. W. Allen, p. 3, Academic Press Inc., New York, N. Y. (1959).

The oxidized emulsifiable high density polyethylene employed in the practice of the instant invention has a melt index in the range 0.1 to 20,000 or more and contains oxygen-containing functional groups in the following ranges:

TABLE I

| Group: | Range milliequivalents/g. oxidized polyethylene |
|---|---|
| Hydroxyl | 0.04–0.17 |
| Carboxyl | 0.20–2.0 |
| Ester | 0.04–0.50 |
| Total carbonyl | [1] 0.46–2.72 |

[1] (1.3–7.6 wt. percent.)

The above described functional groups are the most important ones present in the oxidized polyethylene in terms of chemical reactivity, emulsifiability, promotion of adhesion to substrates, printability, and the like. However, in addition to these groups, other oxygen-containing species are known or believed to be present in the oxidized polyethylene in somewhat lesser concentrations. Examples of these other groups would be ethers (R—O—R) and the non-carbonyl portions of esters

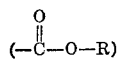

and anhydrides

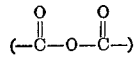

In order to measure quantitatively all of the oxygen present in the oxidized polyethylene, one must therefor resort to a direct elemental analysis of oxygen. In the products of this invention it has been found by such direct analysis that the total chemical combined oxygen content may range from 0.75 to 7.0 weight percent oxygen.

The method by which the polyethylene is oxidized to form the requisite amount of carboxyl in the polymer chains is not critical. Polyethylene can be readily oxidized by various well known methods to give polymers containing carboxyl groups. The techniques for introducing carboxyl groups into polyethylene are exemplified by, but are not limited to, the following methods. For example, polyethylene can be milled in oxygen, oxygen enriched air or air at a temperature ranging from 70° up to the melting point of the polymer. Another method is to suspend particles of polyethylene in water or an organic solvent and either bubble air through the suspension or pressurize the system with air at a temperature ranging from 70° up to the melting point of the polymer. Yet another method is to pass ozone-enriched air or other oxygen-containing gas at a temperature below the melting point of the polymer through a fluidized bed of polyethylene particles. A further method is to press the polyethylene into a film and pass hot air at a temperature ranging from 70° up to the melting point of the polymer over said polymer. In all the aforestated methods of oxidizing polyethylene, ozone can be used as a promoter and is usually added with the oxygen-containing gas stream. In addition, if desired, a minor amount, i.e. 0.05 to 5% by weight of an organic peroxide, nitrogen tetroxide or other oxidation promoter may be admixed with the polymer to increase the oxidation rate. Superatmospheric pressure may be used if desired in any of the oxidation methods employed including those aforestated.

The oxidation step can be terminated at any operable degree of oxidation, i.e. within the range 0.2 to 2.0 milliequivalents carboxyl/g. of polymer and, if desired, subsequently stabilized. For example, a suitable antioxidant such as 4,4"-thiobis (6,t-butyl-meta-cresol) sold under the tradename "Santonox" by Monsanto Chemical Company or N-phenyl-2-naphthylamine can be added to the oxidized polymer. However, stabilization of the oxidized polymer is required only to obtain accurate melt index measurements. In actual practice the oxidized polymer is not ordinarily stabilized in making emulsions.

The oxidized high density polyethylene of the instant invention wherein the carboxyl content is 0.2 to 2.0 milliequivalents/g. polyethylene is readily emulsified in a continuous aqueous phase in the presence of well known emulsifiers and from 40% to 200% of the theoretical amount of a base required to neutralize the carboxylic acid groups present in the polymer. Both ionic and nonionic emulsifying agents are operable to emulsify the oxidized high density polymer. Ionic emulsifiers include, in the anionic class, amine salts of fatty acids. Morpholine, monoethanolamine, 2-amino-2-methyl-1-propanol and the like are suitable amines. Operable fatty acids include oleic, stearic, palmitic, myristic and the like. Sodium, potassium and ammonium salts of the fatty acids are also operable but are somewhat less satisfactory. Salts of alkyl aryl sulfonic acids have also been used as emulsifying agents with good results. Operable ionic emulsifiers in the cationic class include but are not limited to acetate salts of long chain aliphatic amines. Polyoxyethylene esters of fatty acids, polyoxyethylene derivatives of sorbitans or of fatty acid substituted sorbitans, polyoxyethylene ethers of long chain alcohols, polyoxyethylene ethers of alkyl aryl phenols or combinations thereof are examples of a few nonionic emulsifiers operable in this invention. The amount of emulsifier employed is from 1 to 50 parts, preferably 4 to 30 parts emulsifier/100 parts oxidized polyethylene by weight.

The amount of base added to the emulsion is an amount in the range from 40 to 200% of the theoretical amount required to neutralize the carboxylic acid groups on the polymer. When anionic emulsifiers such as amine salts of fatty acids are used, one generally adds an excess of the amine moiety to serve as the base.

The aqueous emulsions of the instant invention contain 10–50% total solids by weight. The oxidized polyethylene, emulsifier, base, and water are combined in any order in a pressure reactor equipped with an efficient stirrer. Air is evacuated and the reactor sealed. The mixture is heated with vigorous stirring to a temperature ranging from the melting point of the oxidized polyethylene up to 200° C. (preferably 140–160° C.) and maintained thereat for periods ranging from 10 minutes to 5 hours under the pressure of the system. The thus formed emulsion is cooled to room temperature with stirring. An example of emulsifying the oxidized high density polyethylene of the instant invention will be given hereinafter.

For treating the nylon or glass fibers, yarns, or fabrics in accord with the instant invention, the polyethylene emulsion can be added in several ways. For example, the polymer emulsion can be sprayed or brushed on the fiber, yarn or fabric. Another method is to immerse the fabric, yarn or fiber in the polyethylene emulsion. Excess liquid can then be removed by passage of the impregnated fiber, yarn, or fabric through squeeze rolls, by heat, by evaporation or any combination thereof or other well known means. To obtain the softening benefits provided by the polyethylene to the fiber, yarn or fabric by means of the instant invention it is preferred that the fiber, yarn or fabric be impregnated with 0.05 to 5.0%, preferably 0.1 to 2.0% nominal dry add-on of polyethylene. Lesser amounts do not afford sufficient softening whereas amounts in excess of the upper limit cause the material to stiffen. The following procedure sets forth one method of treating glass and nylon fabric with an oxidized high density polyethylene emulsion.

The polyethylene was oxidized to the required degree, i.e. 0.2 to 2.0 milliequivalents carboxyl/g., in the solid state in the presence of an oxygen-containing gas in a forced-air oven or ribbon blender at temperatures up to the crystalline melting point of the polymer. The oxidized polymer was then emulsified in a stirred pressure reactor with water, base and a conventional emulsifier at temperatures ranging from the melting point of the polymer up to about 200° C. or more to form emulsions containing 10 to 50% solids.

Glass or nylon fabric swatches 16 x 18 inches were conditioned at 70° F. and 65% relative humidity and weighed. Each swatch was immersed in a fresh portion of diluted polyethylene emulsion (1% polyethylene) or water and padded to a calculated wet pick-up. After immersion in the polyethylene emulsion, the fabric was passed through rubber nip rolls to remove excess emulsion. This process was repeated a second time, that is, the fabric was exposed to two dips in the emulsion and two nips through the squeeze rolls. The fabrics were mounted on laboratory tenter frames at their original dimensions and dried at 140° C. for 10 minutes unless otherwise specified. The fabrics were conditioned for 24 hours and reweighed. The expected ("nominal") dry add-ons were calculated from the wet pick-ups and the concentration of the treating bath. "Nominal dry add-on" is herein defined as the expected dry add-on calculated from the wet pick-up and the concentration of the treating bath. In all examples five or more replicates were used for each treatment.

The treated fabrics were subjected to laundering in a Whirlpool home laundry machine using a mild setting (warm water wash, 120° F., warm water rinse, gentle agitation, and low speed spin). The detergent used was "Tide," manufactured by Proctor and Gamble & Co. The fabrics were tumbled dry in a Whirlpool home dryer. After 5 or 10 launderings the fabrics were mounted on tenter frames at their original dimensions and oven dried.

For testing softness after dry cleaning, the fabrics were dry cleaned in commercial RCA-Whirlpool self-service machines. These machines used perchlorethylene solvent. The cleaning cycle consisted of fluffing (5 minutes), solvent cleaning (10 minutes), extraction (10 minutes), and drying (20 minutes). Subsequently, after the fifth or tenth cycle, the fabrics were wetted out in Stoddard solvent, mounted on tenter frames at their original dimensions, oven dried, and conditioned.

The following examples are set down to illustrate the invention and are not deemed to limit its scope. Throughout the instant invention tests were conducted as follows:

The extent of oxidation of the polyethylene was determined by ascertaining the percent carbonyl of the oxidized polymer by measuring the intensity of infrared absorption at 1720 cm.$^{-1}$, assuming an absorbance characteristic of ketone-type carbonyl. In actuality, other carbonyl-containing functions such as aldehyde, carboxylic acid and carboxylate ester also contribute to the 1720 cm.$^{-1}$ absorption. Therefrom, the values reported as percent carbonyl represent a composite of all of these groups. Measurements were made on a Perkin-Elmer Spectrophotometer Model 221. The reported percent carbonyl is defined as $$\frac{\text{g. carbonyl}}{\text{g. polymer}} \times 100$$

As an alternate method the extent of oxidation of the polyethylene was determined by ascertaining the carboxyl content of the polymeric material by titration with base in the following manner. About 1 g. of the polymer to be analyzed was accurately weighed and dissolved in 200 ml. Erlenmeyer flask on a magnetic stirrer-hot plate. About 15 drops of 0.1% phenolphthalein in absolute ethanol was added. While stirring was continued and the temperature maintained at 120–130° C., the solution was titrated to a colorless end point with standard 0.05 N potassium hydroxide in absolute ethanol.

Calculation:

$$\text{milliequivs. COOH per g.} = \frac{(\text{ml. of KOH})(\text{Normality of KOH})}{(\text{g. of polymer})}$$

Melt indices (MI) were measured under the conditions specified in ASTM D1238–57T under Condition E (melt index, i.e. MI), under Condition D and converted to MI by the formula log MI=0.921 log F+1.039 and under Condition F (high load melt index, i.e. HLMI).

Densities of the polymer in g./cc. were measured under the conditions specified in ASTM D1505–57T.

Reduced specific viscosity, i.e. RSV, was obtained by dissolving 0.1 g. of the polymer in 100 cc. Decalin at 135° C. in accord with the procedure of ASTM D1601–61.

The crystalline melting point of the polymer was measured as the temperature at which birefringence disappeared from the sample when viewed through crossed Nicol prisms in a hot stage microscope heated at a rate of 1° C./min.

The viscosity of the polyethylene emulsions was measured at 23° C. with a Brookfield Viscometer Model LVT using Spindle No. 1 at 60 r.p.m.

Tear strength was measured on conditioned fabrics in the warp direction using the Elmendorf tester according to the ASTM D1424–59 test method.

The method used to evaluate softness involved subjective rating by a panel of eight experts. To minimize wrinkles or surface irregularities, all fabrics were mounted on tenter frames, oven dried, and conditioned before measurement. The experts evaluated the specimens by moving their fingers over the fabric surface (friction of fabric against skin) and by squeezing or compressing the fabrics gently with the fingers (resilience and ease of bending). The average rating was converted to a uniform scale of 10 (softest) to 1 (least soft).

Total combined oxygen content of the oxidized polyethylene was determined by the method of J. Unterzaucher, Ber. 73, 391 (1940).

Hydroxyl content of the oxidized polyethylene was determined by quantitative acetylation with $C^{14}$ labeled acetic anhydride. The thus labeled polymer was precipitated with acetone, washed to remove excess acetic anhydride, dried and pressed into plaque of 10–20 mil thickness. Radiochemical analysis of the pressed plaque gives a determination of hydroxyl groups.

Ester content of the oxidized polyethylene was determined by infrared spectrometric measurements of the 1178 cm.$^{-1}$ ester C—O stretching vibration band of the oxidized polyethylene was calculated from tis comparison. to those made from mixtures of known amounts of long-chain esters in polyethylene and the ester content of the oxidized polyethylene was calculated from this comparison.

Unless otherwise noted, all parts and percentages are by weight.

The following example shows a method of oxidizing the high density polyethylene of the instant invention.

Example 1

200 lbs. of commercialy available polyethylene having a density of 0.955, a crystalline melting point of 135° C., a reduced specific viscosity of 4.5 and a melt index of 0.0 was oxidized in air in a ribbon blender at 114–118° C., for 57 hrs. The thus oxidized polyethylene had a density of 0.99, a melt index of 540, a carboxyl content of 0.50 milliequivalent/g. and contained 2.21 weight percent carbonyl.

The following example shows the emulsifiability of the oxidized polyethylene of Example 1.

Example 2

To a 2-quart "Chemco" stirred reactor equipped with a high speed air stirrer was charged 450 parts distilled water, 100 parts of oxidized polyethylene from Example 1, 7.9 parts of a 32% KOH solution and 31 parts of a non-ionic emulsifier, i.e. a polyoxyethylene nonyl phenol ether sold under the trade name "Renex 697" by Atlas Chemical Industries, Inc. Air was evacuated from the reactor and the reactor was sealed. Vigorous stirring was commenced and the reactor was heated to 150° C. The mixture was maintained at 150–155° C. and 55 p.s.i.g. for 30 mins. with vigorous stirring. Stirring was continued while the thus formed emulsion was cooled to room temperature. The resulting stable emulsion (23.7% solids) had a viscosity of 6.0 centipoises at 23° C. when measured with a Brookfield Viscometer Model LVT using Spindle No. 1 at 60 r.p.m. Starting oxidizing polyethylene was shown to be 99+ percent emulsified when filtered through a 100 mesh screen at 25° C.

The following example shows the improved softness afforded by the high density polyethylene emulsion when applied to nylon.

Example 3

Swatches of nylon taffeta, type 200, containing 144 x 72 yarns per inch and weighing 2.9 oz. per square yard were padded with the polyethylene emulsion from Example 2 after said emulsion was diluted with water so as to contain 1% solids. The swatches were given two dips and two nips to a wet pick-up of 50%. The swatches were tentered to their original dimensions and oven dried at 140° C. for 10 mins. The dried fabrics had 0.5% nominal dry solids add-on based on wet pick-up. Similar fabric swatches were treated with a more diluted emulsion containing 0.2% solids so the final dried fabric had 0.1% nominal dry solids add-on. The relative softness of these fabrics was rated by eight experienced textile technologists.

The fabrics were laundered for 10 cycles in a home washing machine under a standard 8 lb. load using a synthetic detergent composition solid under the trade name "Tide" manufactured by Proctor & Gamble Mfg. Co. and also in a commercial dry cleaning plant using perchlorethylene solvent with 1% dry cleaning detergent added using the recommended 8 lb. load for 10 cycles. The results are shown in Table I below. The average ratings are projected to a basis of: 10=softest and 1=least soft.

TABLE I

| Treatment polyethylene add-on (based on wet pick-up) | Panel softness ratings | | |
|---|---|---|---|
| | After treatment | After 10 launderings | After 10 drycleanings |
| 0.5% | 5.7 | 9.0 | 9.2 |
| 0.1% | 7.5 | 5.5 | 3.6 |
| Untreated | 3.3 | 1.8 | 3.6 |

The following shows the softness afforded by the high density polyethylene emulsion when applied to a fiber glass fabric.

Example 4

Swatches of fiber glass fabric, 43 x 32 yarns per inch, weighing 6.5 oz. per sq. yard were treated with the diluted polyethylene emulsion from Example 2 in a manner similar to that described in Example 3. The softness of the fabrics after treatment and after 1 and 2 dry cleaning cycles is shown in Table II below.

TABLE II

| Treatment polyethylene add-on (based on wet pick-up) | Panel softness ratings | | |
|---|---|---|---|
| | After treatment | After 1 drycleaning cycle | After 2 drycleaning cycles |
| 0.5% | 7.5 | 9.3 | 10.0 |
| 0.1% | 8.1 | 6.1 | 5.5 |
| Untreated | 1.0 | 1.0 | 1.0 |

The following example shows the increase in softness afforded by treating nylon and fiber glass with polyethylene emulsions.

Example 5

Swatches of nylon taffeta, type 200, containing 144 x 72 yarns per in. and weighing 2.9 oz. per sq. yd. and swatches of fiber glass fabric, 43 x 32 yarns per in. and weighing 6.5 oz. per sq. yd. were treated with polyethylene emulsion from Example 2 after said emulsion was diluted with water so as to contain 1% solids. The swatches were each given 2 dips in the emulsion and 2 nips through squeeze rolls to a wet pick-up of 50%. The swatches were tentered to their original dimensions and oven dried at 140° C. for 10 minutes. The dried fabrics had 0.5% solids add-on based on wet pick-up. Similar fabric swatches were treated with a more diluted polyethylene emulsion containing 0.2% solids so the final dried fabric had a 0.1% solids add-on on a wet basis. Control runs of both the nylon and the fiber glass swatches was made wherein the swatches were dipped in water instead of polyethylene emulsions. Each test was performed on 5 swatches of fabrics. The relative softness of these fabrics was rated by eight experienced textile technologists. The results of said ratings are set forth in Table III.

TABLE III

| Fabric | Emulsion | Nominal dry add-on, (percent) | Panel softness rating [1] | Tear strength |
|---|---|---|---|---|
| Nylon | Water | 0 | 3.3 | 3350 |
| Do | Polyethylene | 0.10 | 7.5 | 3870 |
| Do | do | 0.49 | 5.7 | 3970 |
| Glass | Water | 0 | 1.0 | |
| Do | Polyethylene | 0.10 | 8.0 | |
| Do | do | 0.50 | 7.5 | |

[1] Relative softness value within each fabric group (10 is softest, 1 is least soft).

To show the uniqueness of the softening effect that high density polyethylene has on nylon and glass fiber, the following example was carried out using other well known synthetic fabrics.

Example 6

Example 5 was repeated except that the fabrics tested were "Dacron" a trade name for Du Pont's polyester fiber of a diol and a member selected from the group consisting of terephthalic acid and a mixture of dibasic acids of which terephthalic acid comprises at least about 90% and "Acrilan" a trade name for a synthetic fiber made from at least 85% acrylonitrile manufactured by Chemstrand Corporation. The former was spun Dacron containing 66 x 62 yarns per in. and weighing 4.1 oz. sq. yd. and the latter material was spun Acrilan 16 containing 63 x 50 yarns per in. and weighing 3.4 oz. sq. yd. The results are shown in Table IV.

TABLE IV

| Fabric | Emulsion | Nominal dry add-on (percent) | Panel softness rating [1] |
|---|---|---|---|
| Acrilan | Water | 0 | 7.2 |
| Do | Polyethylene | 0.10 | 7.7 |
| Do | do | 0.50 | 1.5 |
| Dacron | Water | 0 | 8.5 |
| Do | Polyethylene | 0.10 | 7.0 |
| Do | do | 0.50 | 1.0 |

[1] Relative softness value within each fabric group (10 is softest, 1 is least soft).

As can be seen from Table IV high density polyethylene increases the stiffness of these other well-known synthetic fabrics.

Although the coating compositions of this invention have been described in terms of application to fabrics, they may also be applied to fibers, filaments, yarns, warps; knitted, woven or nonwoven fabrics; and to other shaped articles such as films, rods, bristles, and the like. The coating composition may be applied by spraying, roller coating, brushing, dipping, or other suitable means.

What is claimed is:

1. An article of manufacture having improved softness consisting essentially of a fabric from the group consisting of nylon and fiber glass coated with an emulsion of an oxidized polymer selected from the group consisting of oxidized polyethylene and oxidized copolymers of ethylene said oxidized polymer having a density in the range 0.937 to 1.05 g./cc., a carboxyl content of 0.2 to 2.0 milliequivalents/g. and being prepared by oxidation of an ethylene homopolymer or copolymer having a density of 0.935 to 0.970 g./cc. and a molecular weight of 20,000 to 200,000.

2. A process for softening fabric made from a member of the group consisting of nylon and fiber glass which comprises applying to said fabric a coating of an emulsion of an oxidized polymer selected from the group consisting of oxidized polyethylene and oxidized copolymers of ethylene said oxidized polymer having a density in the range of 0.937 to 1.05 g./cc., a carboxyl content of 0.2 to 2.0 milliequivalents/g. and being prepared by oxidation of an ethylene homopolymer or copolymer having a density of 0.935 to 0.970 g./cc. and a molecular weight of 20,000 to 2,000,000, said polymer coating being 0.05 to 5% by weight of the treated group member.

3. A process for softening fabric made from a member of the group consisting of nylon and fiber glass which comprises applying to said fabric a coating of an emulsion of an oxidized polymer selected from the group consisting of oxidized polyethylene and oxidized copolymers of ethylene said oxidized polymer having a density in the range of 0.937 to 1.05 g./cc., a carboxyl content of 0.2 to 2.0 milliequivalents/g. and being prepared by oxidation of an ethylene homopolymer or copolymer having a density of 0.935 to 0.970 g./cc. and a molecular weight of 20,000 to 2,000,000, said polymer coating being 0.5 to 5% by weight of the treated group member, and thereafter heating said treated group member to consolidate said coating thereon.

References Cited

UNITED STATES PATENTS

| 3,103,448 | 9/1963 | Ross | 117—139.5 |
| 3,215,556 | 6/1962 | Kehr | 8—115.6 XR |
| 3,245,831 | 4/1966 | Shippee | 8—115.6 XR |

OTHER REFERENCES

Rosenbaum: Use of Polyethylene Emulsions in Textile Applications, pp. 46–50, American Dyestuff Reporter, May 18, 1959.

ALFRED L. LEAVITT, *Primary Examiner.*

W. F. CYRON, *Assistant Examiner.*

U.S. Cl. X.R.

117—138.5, 138.8, 139.5, 161